United States Patent
Bae

(10) Patent No.: US 9,721,721 B2
(45) Date of Patent: Aug. 1, 2017

(54) WIRELESS POWER TRANSMITTER, WIRELESS POWER RECEIVER AND IMPEDENCE CONTROL METHOD

(75) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 650 days.

(21) Appl. No.: 14/348,732

(22) PCT Filed: Sep. 10, 2012

(86) PCT No.: PCT/KR2012/007270
§ 371 (c)(1),
(2), (4) Date: Mar. 31, 2014

(87) PCT Pub. No.: WO2013/048034
PCT Pub. Date: Apr. 4, 2013

(65) Prior Publication Data
US 2014/0246920 A1    Sep. 4, 2014

(30) Foreign Application Priority Data

Sep. 29, 2011  (KR) .................. 10-2011-0099415
Dec. 19, 2011  (KR) .................. 10-2011-0137785

(51) Int. Cl.
*H01F 38/14*  (2006.01)
*H02J 5/00*  (2016.01)
*H02J 7/02*  (2016.01)

(52) U.S. Cl.
CPC .............. *H01F 38/14* (2013.01); *H02J 5/005* (2013.01); *H02J 7/025* (2013.01)

(58) Field of Classification Search
CPC ..... H03B 5/0037; B60L 11/188; B60L 11/182
See application file for complete search history.

(56) References Cited

U.S. PATENT DOCUMENTS

| 5,698,838 A | 12/1997 | Yamahuchi |
| 5,917,712 A | 6/1999 | Okura et al. |
| 2008/0111518 A1 | 5/2008 | Toya |
| 2010/0201316 A1 | 8/2010 | Takada et al. |
| 2010/0225271 A1 | 9/2010 | Oyobe et al. |

(Continued)

FOREIGN PATENT DOCUMENTS

| CN | 101835653 A | 9/2010 |
| DE | 202009009693 U1 | 11/2010 |

(Continued)

OTHER PUBLICATIONS

Office Action dated Nov. 2, 2015 in Chinese Application No. 201280058864.8.

(Continued)

*Primary Examiner* — Jeffrey Shin
(74) *Attorney, Agent, or Firm* — Saliwanchik, Lloyd & Eisenschenk

(57) ABSTRACT

Disclosed is a wireless power transmitter which transmits power through a wireless power receiver to a load side. The wireless power transmitter includes a power source for generating AC power; a transmission coil for wirelessly transmitting the AC power to a reception coil of the wireless power receiver; and a detecting unit for detecting a coupling state between the transmission coil and the reception coil.

14 Claims, 7 Drawing Sheets

(56) References Cited

U.S. PATENT DOCUMENTS

| | | | |
|---|---|---|---|
| 2010/0231340 | A1 | 9/2010 | Fiorello et al. |
| 2010/0244577 | A1 | 9/2010 | Shimokawa |
| 2010/0259217 | A1 | 10/2010 | Baarman et al. |
| 2011/0227421 | A1 | 9/2011 | Sakoda et al. |
| 2012/0306265 | A1* | 12/2012 | Yamamoto .............. B60L 5/005 307/9.1 |
| 2012/0326499 | A1 | 12/2012 | Ichikawa et al. |
| 2013/0063160 | A1 | 3/2013 | Nakano et al. |
| 2013/0119930 | A1* | 5/2013 | Sakoda ................ B60L 11/182 320/108 |

FOREIGN PATENT DOCUMENTS

| | | |
|---|---|---|
| JP | 07-046841 A | 2/1995 |
| JP | 2002-078248 A | 3/2002 |
| JP | 2008-099352 A | 4/2008 |
| JP | 2009112153 A | 5/2009 |
| JP | 2011147213 A | 7/2011 |

OTHER PUBLICATIONS

European Search Report dated May 21, 2015 in European Application No. 12836388.4.
International Search Report in International Application No. PCT/KR2012/007270, filed Sep. 10, 2012.
Office Action dated Feb. 6, 2017 in Korean Application No. 10-2013-0008136.

* cited by examiner (a)

(b)

WIRELESS POWER TRANSMITTER, WIRELESS POWER RECEIVER AND IMPEDENCE CONTROL METHOD

CROSS-REFERENCE TO RELATED APPLICATIONS

This application is the U.S. national stage application of International Patent Application No. PCT/KR2012/007270, filed Sep. 10, 2012, which claims priority to Korean Application Nos. 10-2011-0099415, filed Sep. 29, 2011, and 10-2011-0137785, filed Dec. 19, 2011 the disclosures of each of which are incorporated herein by reference in their entirety.

TECHNICAL FIELD

The disclosure relates to wireless power transmitting technology. In more particular, the disclosure relates to technology for wireless power transmission capable of improving power efficiency according to a coupling state between a wireless power transmitter and a wireless power receiver.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Recently, among wireless power transmitting technologies, an energy transmitting scheme employing resonance or an energy transmitting scheme, in which a transmission side employs resonance and a reception side employs magnetic induction, has been widely used.

The wireless power transmitting scheme may easily charge electronic appliances such as a portable device by wirelessly transferring power through coils which are installed in a transmission side and a reception side, respectively.

In the wireless power transmitting scheme, the coupling state of the coils between the transmission side and the reception side may vary according to a power transmitting state and the like.

However, according to the related art, since an impedance of a load side connected to the reception side is fixed, power transmission efficiency may be reduced as the coupling state varies.

DISCLOSURE OF INVENTION

Technical Problem

An object of the disclosure is to provide a method capable of controlling an impedance of a load according to a coupling state between a wireless power transmitter and a wireless power receiver, thereby improving power transmission efficiency.

Another object of the disclosure is to provide a method capable of detecting a coupling factor between a transmission resonant coil and a reception resonant coil during wireless power transmission and controlling an impedance of a load according to the detected coupling factor, thereby improving power transmission efficiency.

Still another object of the disclosure is to provide a method capable of detecting a coupling state between a wireless power transmitter and a wireless power receiver and controlling transmission power of the wireless power transmitter according to the detected coupling state, thereby improving power transmission efficiency.

Solution to Problem

According to the embodiment, there is provided a wireless power transmitter which wirelessly transmits power through a wireless power receiver to a load side. The wireless power transmitter includes a power source for generating AC power; a transmission coil for wirelessly transferring the AC power to a reception coil included in the wireless power receiver by using resonance; and a detecting unit for detecting a coupling state between the transmission coil and the reception coil.

According to the embodiment, there is provided a wireless power receiver which transfers power received from a wireless power transmitter to a load side. The wireless power receiver includes a reception coil for transferring the power, which is wirelessly received from a transmission coil included in the wireless power transmitter by using resonance, to the load side; and an impedance control unit for controlling an impedance of the load side according to a coupling state between the transmission coil and the reception coil.

According to the embodiment, there is provided a wireless power transmitter which wirelessly transmits power to a wireless power receiver including a reception coil. The wireless power transmitter includes a power source for generating AC power; a transmission coil for wirelessly transmitting the AC power to the reception coil by using electromagnetic induction; a detecting unit for detecting a coupling state between the transmission coil and the reception coil; and a power control unit for controlling the power transmitted by the wireless power transmitter based on the coupling state.

According to the embodiment, there is provided an impedance control method of a wireless power transmitting system for controlling an impedance of a load side. The impedance control method includes the steps of: detecting a coupling state between a wireless power transmitter and a wireless power receiver; transmitting information about the coupling state to the wireless power receiver; determining the impedance of the load side based on the information about the coupling state; and controlling the impedance of the load side according to the determined impedance.

Advantageous Effects of Invention

According to the embodiment, during the wireless power transmission procedure, a coupling factor between a transmission resonant coil and a reception resonant coil is detected and an impedance of a load is controlled according to the detected coupling factor, so the power transmission efficiency may be improved.

In addition, according to the embodiment, transmission power is controlled at a predetermined level according to a coupling factor between a resonance type of a wireless power transmitter and an induction type of a wireless power receiver, so power may be stably provided to the wireless power receiver.

BEST MODE FOR CARRYING OUT THE INVENTION

Hereinafter, exemplary embodiments of the disclosure will be described in detail so that those skilled in the art can easily comprehend the disclosure.

Hereinafter, a wireless power transmitter, a wireless power receiver, a wireless power transmission system and an impedance control method according to the embodiment will be described in detail with reference to FIGS. 1 to 9.

Figure 1:
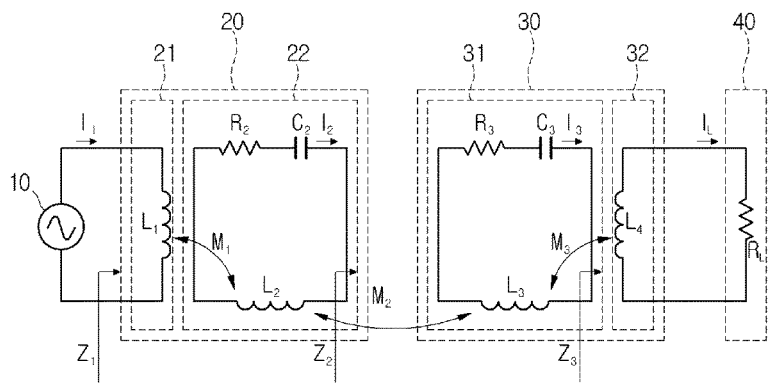
FIG. 1 is a circuit diagram showing an equivalent circuit of a wireless power transmission system according to one embodiment.
Figure 2:
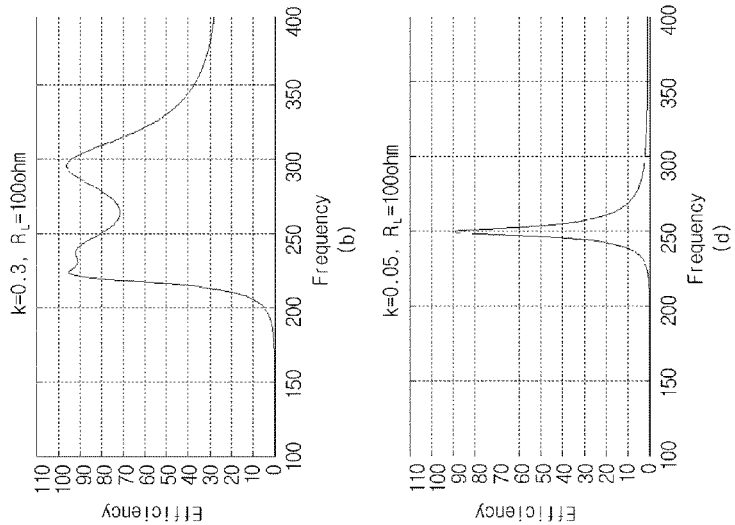
FIG. 2 is a graph showing frequency-to-power transmission efficiency according to a coupling factor (K) when a detecting unit and an impedance control unit are not applied to a wireless power transmission system.
Figure 2:
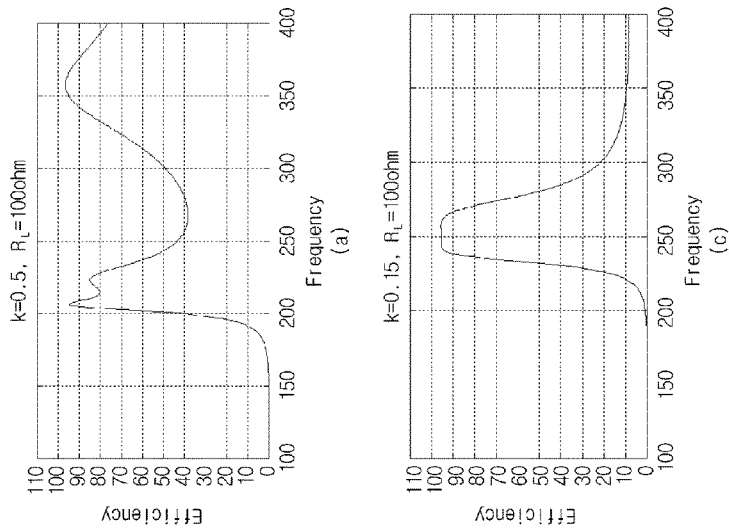
Figure 3:
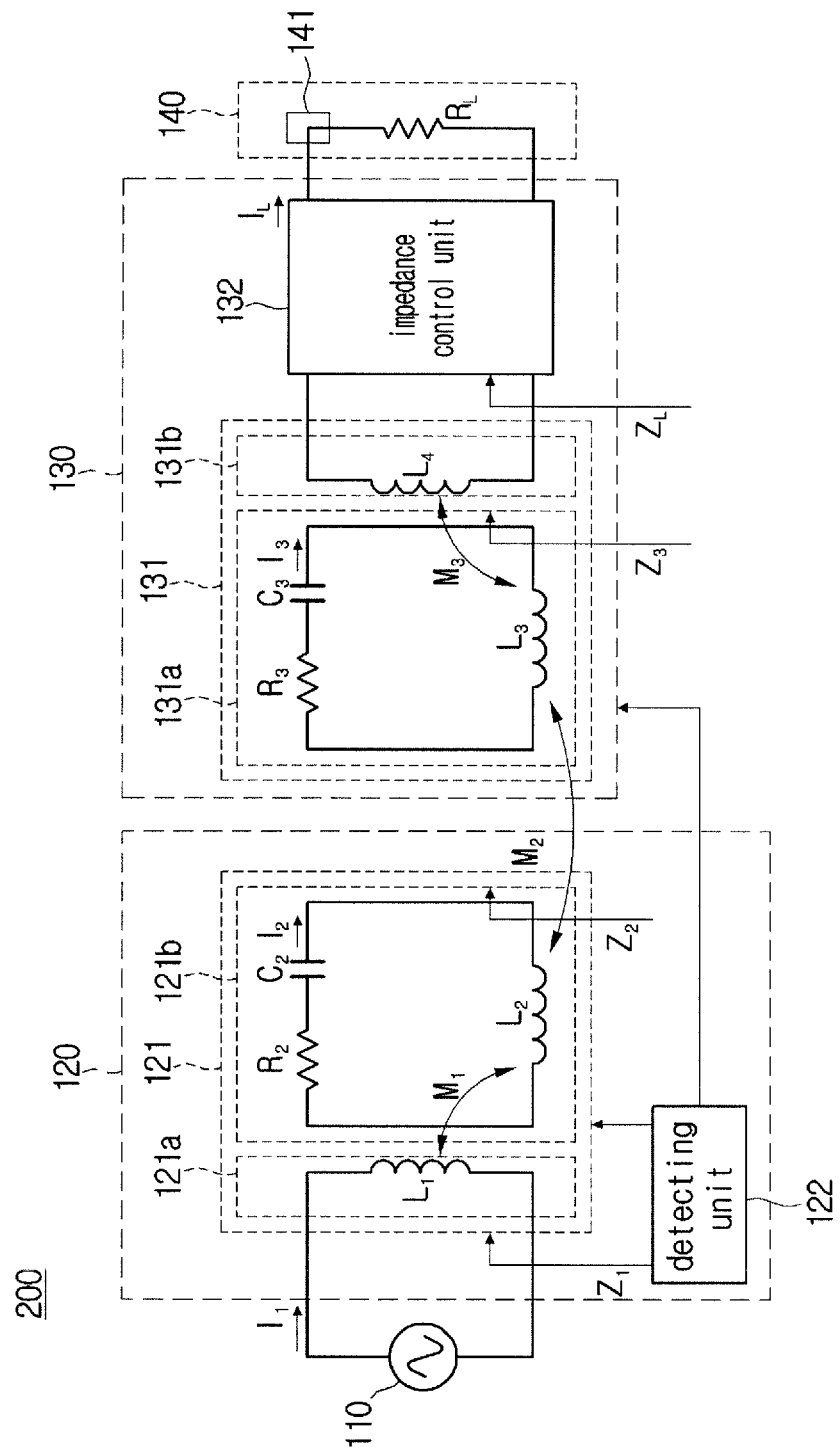
FIG. 3 is a view illustrating a configuration of a wireless power transmission system according to another embodiment.
Figure 4:
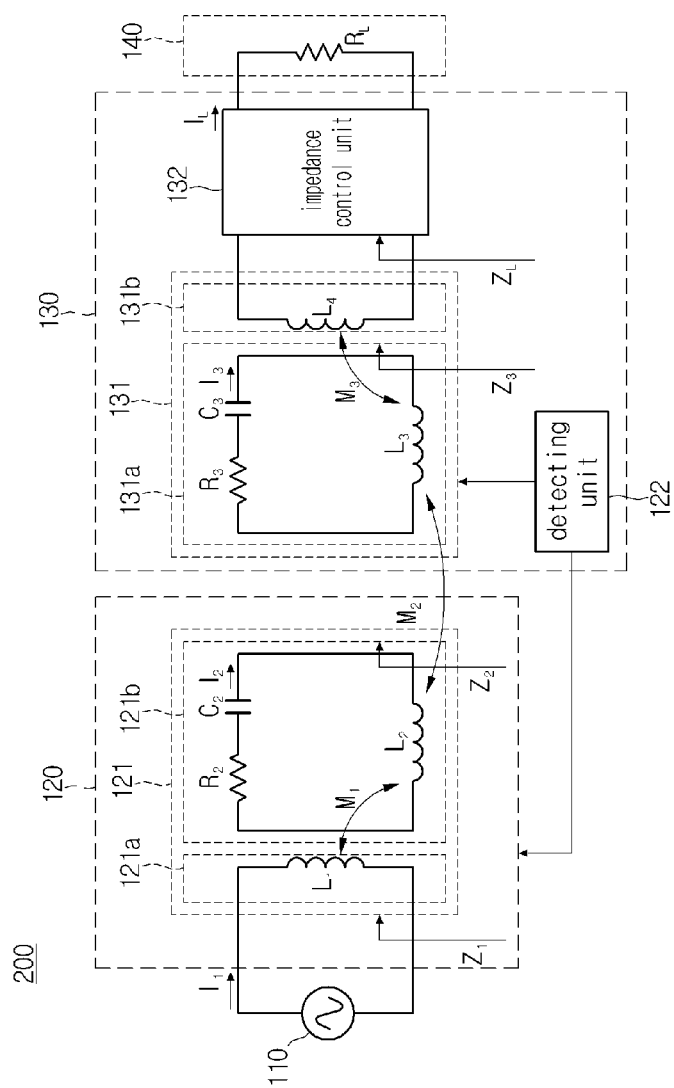
FIG. 4 is a view illustrating a configuration of a wireless power transmission system according to another embodiment.
Figure 5:
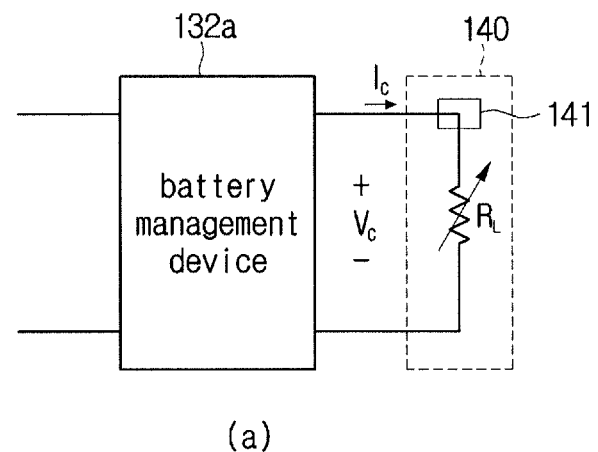
FIG. 5 is a view illustrating a method for controlling an impedance of both terminals of a load side according to one embodiment.
Figure 5:
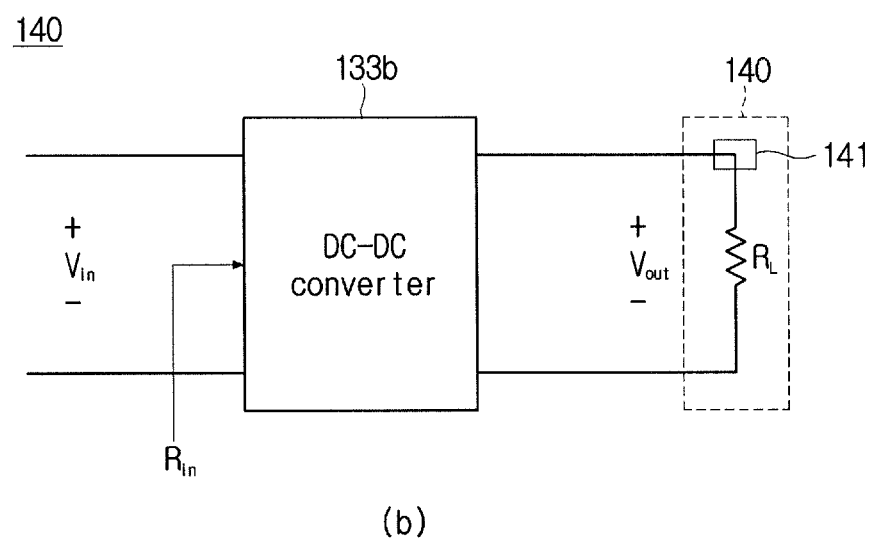
Figure 6:
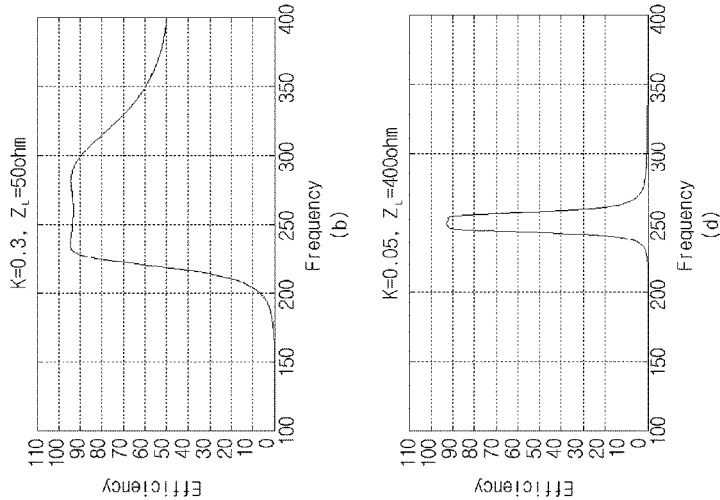
FIG. 6 is a graph showing frequency-to-power transmission efficiency when an impedance of a load side is controlled according to a coupling factor (K) a wireless power transmission system according to one embodiment.
Figure 6:
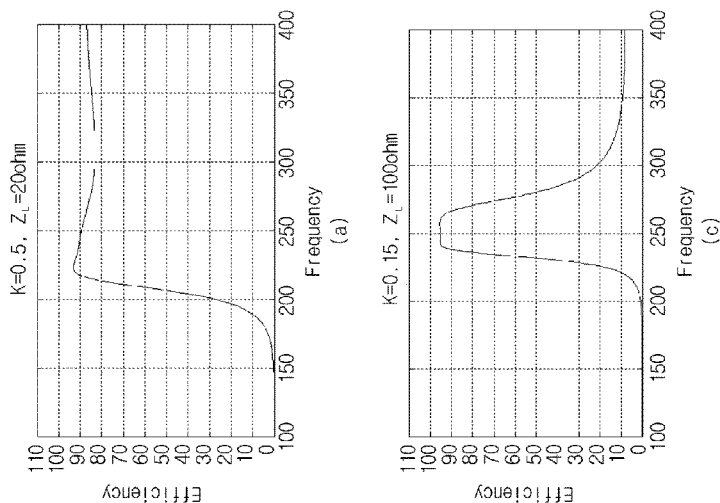
Figure 7:
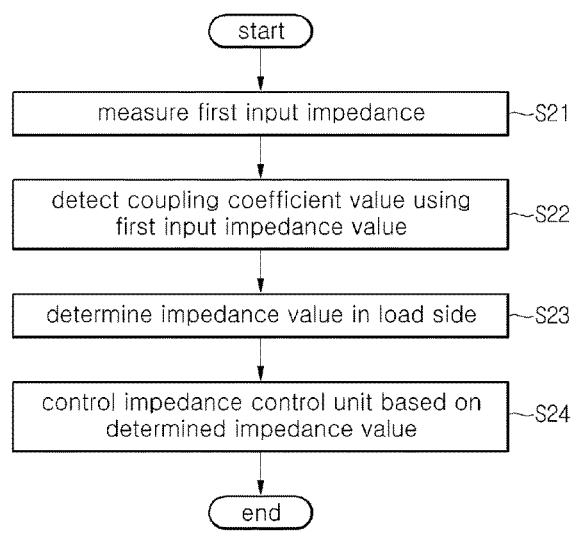
FIG. 7 is a flowchart illustrating a method for controlling an impedance according to a first embodiment.
Figure 8:
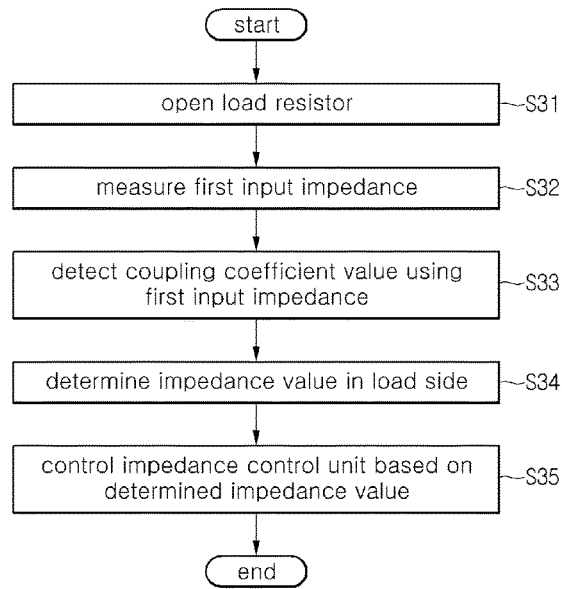
FIG. 8 is a flowchart illustrating a method for controlling an impedance according to a second embodiment.
Figure 9:
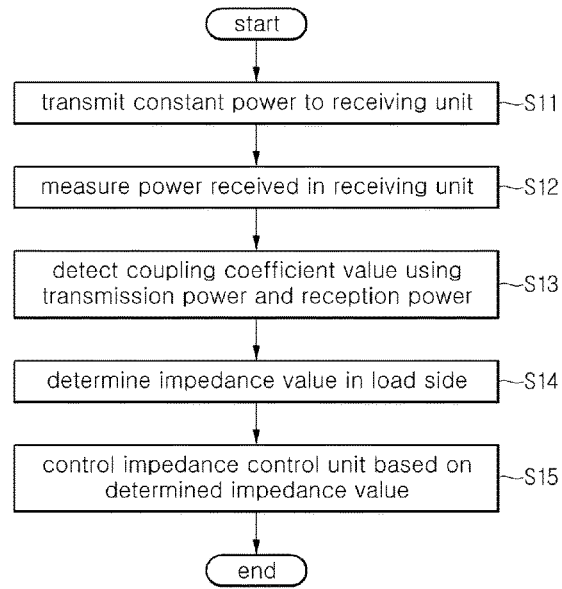
FIG. 9 is a flowchart illustrating a method for controlling an impedance according to a third embodiment.

FIG. 1 is a view illustrating a configuration of the wireless power transmission system according to one embodiment; FIG. 2 is a graph showing frequency-to-power transmission efficiency according to a coupling factor (K) when an impedance of a load side is fixed in the wireless power transmission system; FIG. 3 is a view illustrating a configuration of a wireless power transmission system according to another embodiment; FIG. 4 is a view illustrating a configuration of a wireless power transmission system according to still another embodiment; FIG. 5 is a view illustrating one example of controlling an impedance of a load side according to one embodiment; FIG. 6 is a graph showing frequency-to-power transmission efficiency when an impedance of a load side is controlled according to an impedance control method of one embodiment; FIG. 7 is a flowchart illustrating a method for controlling an impedance according to one embodiment; FIG. 8 is a flowchart illustrating a method for controlling an impedance according to another embodiment; and FIG. 9 is a flowchart illustrating a method for controlling an impedance according to still another embodiment.

First, referring to FIG. 1, the wireless power transmitting system 100 includes a power source 10, a transmitting unit 20, a receiving unit 30, and a load side 50.

The power generated from the power source 10 is provided to the transmitting unit 20, such that the power is transferred by resonance to the receiving unit 30, which is resonant with the transmitting unit 20. The power transferred to the receiving unit 30 is transferred via a rectifier circuit (not shown) to the load side 40. The load side 40 may be a battery or a predetermined apparatus which needs power. In the embodiment, the load side 40 is denoted as a load resistor RL.

In detail, the power source 10 is an AC power source for supplying AC power of a predetermined frequency.

The transmitting unit 20 includes a transmission coil unit 21 and a transmission resonant coil unit 22. The transmission coil unit 21 is connected to the power source 10, such that an AC current flows through the transmission coil unit 21. When an AC current flows through the transmission coil unit 21, an AC current is induced to the transmission resonant coil unit 22 physically apart from the transmission coil unit 21 due to electromagnetic induction. The power transferred to the transmission resonant coil unit 22 is transmitted by resonance to the wireless power receiving unit 30 which forms a resonance circuit with the transmitting unit 20.

The transmission coil unit 21 includes a transmission coil L1, both terminals of which are connected to both terminals of the power source 10. The transmission coil unit 21 may further include a capacitor (not shown) and form a circuit having suitable inductance and capacitance values. The capacitance value may be fixed.

The transmission resonant coil unit 22 includes a transmission resonant coil L2, a capacitor C2, and a resistor R2. The transmission resonant coil L2 includes one terminal connected to one terminal of the capacitor C2 and the other terminal connected to one terminal of the resistor R2. The other terminal of the resistor R2 is connected to the other terminal of the resistor R2. The resistor 2 denotes an amount of power loss caused by the transmission resonant coil L2.

The power receiving unit 30 includes a reception resonant coil unit 31 and a reception coil unit 32.

The reception resonant coil unit 31 maintains a resonant state with the transmission resonant coil unit 22 at the resonance frequency. That is, the reception resonant coil unit 31 is coupled to the transmission resonant coil unit 22 and an AC current flows therethrough, such that power may be transferred to the receiving unit 30 in a nonradiative scheme.

The reception coil unit 32 receives power by electromagnetic induction from the reception resonant coil unit 31. The power transferred to the reception coil unit 32 is rectified by the rectifier circuit (not shown) and the rectified power is transferred to the load side 40.

The reception resonant coil unit 31 includes a reception resonant coil L3, a capacitor C3 and a resistor R3. The reception resonant coil L3 includes one terminal connected to one terminal of the capacitor C3 and the other terminal connected to one terminal of the resistor R3. The other terminal of the resistor R3 is connected to the other terminal of the capacitor C2. The resistor R3 denotes an amount of power loss caused by the reception resonant coil L3.

The reception coil unit 32 includes a reception coil L4, both terminals of which are connected to both terminals of the load side 40. The reception coil unit 32 may further include a capacitor (not shown) and form a circuit having suitable inductance and capacitance values.

Power may be transferred by resonance between two LC circuits which are impedance-matched with each other. The power transmission scheme using the resonance can transmit the power farther than the power transmission scheme using the electromagnetic induction with the higher power transmission efficiency.

When the transmission resonant coil unit 22 transmits power to the reception resonant coil unit 31, an AC current flows through the reception resonant coil unit 31. The reception resonant coil unit 31 transfers the power received from the transmission resonant coil unit 22 by electromagnetic induction to the reception coil unit 32. The reception coil unit 32 transfers the power received from the reception resonant coil unit 31 through a rectifier circuit (not shown) to the load side 40.

The power transmission efficiency of the wireless power transmission system may be calculated with an output power PL consumed in the input power P1 and the load side 40, which may be calculated by using a first input impedance Z1, a second input impedance Z2, a third input impedance Z3, a first current I1, a second current I2 and a third current I3.

Hereinafter, equations related to the first, second and third impedances Z1, Z2 and Z3 and the first, second and third currents I1, I2 and I3 will be described.

The third impedance Z3 means an impedance seen from the reception resonant coil L3 to the load side 40 and may be expressed by following Equation 1:

$$Z_3 = \frac{\omega^2 M_3^2}{R_L + j\omega L_4} \qquad \text{Equation 1}$$

Wherein, denotes a resonant frequency when the transmission resonant coil L2 and the reception resonant coil L3 resonate with each other, $M_3$ denotes a mutual inductance between the reception resonant coil L3 and the reception coil L4, $R_L$ denotes an impedance of the load side. The mutual inductance ($M_3$) between the reception resonant coil L3 and the reception coil L4 may have a constant value.

Since the resonance frequency ( ) the load resistance ($R_L$), the inductance ($L_4$) of the reception coil L4 and mutual inductance ($M_3$) between the reception resonant coil L3 and the reception coil L4 have constant values, the third impedance Z3 may have a value which is already known.

The Equation 1 is expressed in frequency domain, and following equations will be all expressed in frequency domain.

The second input impedance Z2 means an impedance seen from the transmission unit 20 to the reception unit 30 and may be expressed by following Equation 2:

$$Z_2 = \frac{j\omega^3 C_3 M_2^2}{1 - \omega^2 L_3 C_3 + j\omega C_3 (Z_3 + R_3)} \qquad \text{Equation 2}$$

Wherein, $M_2$ denotes a mutual inductance between the transmission resonant coil L2 and the reception resonant coil L3, $C_3$ denotes a capacitor expressed when the reception resonant coil unit 31 is converted into an equivalent circuit.

In addition, $R_3$ denotes resistance corresponding to an amount of power loss caused in the reception resonant coil L3.

Although the capacitor C3 and the leakage resistor R3 may have constant values, the mutual inductance $M_2$ has a value which may be varied according to a coupling factor K between the transmission resonant coil L2 and the reception resonant coil L3.

The first input impedance Z1 means an impedance seen from the power source 10 to the transmission unit 20 and may be expressed by following Equation 3:

$$Z_1 = \frac{j\omega^3 C_2 M_1^2}{1 - \omega^2 L_2 C_2 + j\omega C_2 (Z_2 + R_2)} \qquad \text{Equation 3}$$

Wherein, $M_1$ denotes a mutual inductance between the transmission coil L1 and the transmission resonant coil L2.

If the current flowing through the reception resonant coil unit 32 is denoted as I3, I3 may be expressed by following Equation 4:

$$I_3 = \frac{R_L}{j\omega M_3} I_L \qquad \text{Equation 4}$$

Wherein, $I_L$ denotes a current flowing through the load side 40.

If the current flowing through the transmission resonant coil unit 22 is denoted as I2, I2 may be expressed by following Equation 5:

$$i_2 = -\frac{I_3}{\omega^2 M_2 C_3}(1 - \omega^2 L_3 + j\omega C_3 (R_3 + Z_3)) \qquad \text{Equation 5}$$

If the current flowing through the transmission coil unit 21 is denoted as I1, I1 may be expressed by following Equation 6:

$$I_1 = -\frac{I_2}{\omega^2 M_1 C_2}(1 - \omega^2 L_2 + j\omega C_2 (R_2 + Z_2)) \qquad \text{Equation 6}$$

Wherein, M1 denotes a mutual inductance between the transmission coil L1 and the transmission resonant coil L2, C2 denotes a capacitor expressed when the transmission resonant coil unit 22 is converted into an equivalent circuit, and R2 denotes a resistance corresponding to an amount of power loss caused in the reception resonant coil L3.

In order to measure the power transmission efficiency of the wireless power transmission system, an input power P1 and an output power PL which is consumed in the load resistor may be obtained from the equations 1 to 6.

The input power P1 may be expressed by following Equation 7:

$$P_L = I_1^2 Z_1 \qquad \text{Equation 7}$$

Since the current I1 flowing through the transmission coil unit 21 may be obtained from the equation 6 and the first input impedance Z1 may be obtained from the equation 3, the input power P1 may be obtained by using the two values.

The output power PL consumed in the load side 40 may be expressed by following equation 8:

$$P_L = I_L^2 R_L \qquad \text{Equation 8}$$

Thus, since the current IL flowing through the load side 40 may be obtained from the equation 4 and the impedance RL of the load side 40 is a constant value, the output power PL may be obtained by using the two values.

Accordingly, the power transmission efficiency E may be calculated by using the input power P1 and the output power PL with following equation 9:

$$E = \frac{P_L}{P_I} = \frac{I_L^2 R_L}{I_1^2 Z_1} \qquad \text{Equation 9}$$

The current I1 flowing through the transmission coil unit 21 has a value which may be varied by equations 5 and 6 according to the value of the mutual inductance M2, and the first input impedance Z1 has a value which may be also varied by equation 2 and 3 according to the value of the mutual impedance M2.

Meanwhile, the mutual inductance M2 may be expressed by following equation 10:

$$M_2 = K\sqrt{L_2 L_3} \qquad \text{Equation 10}$$

Wherein, the coupling factor K expresses a degree of electromagnetic coupling between the transmission resonant coil L2 and the reception resonant coil L3 and has a value which may be varied by at least one of a distance, a direction, and a location between the transmission unit 20 and the reception unit 30 of the wireless power transmission system.

FIG. 2 is a graph showing frequency-to-power transmission efficiency according to a coupling factor (K) when the impedance of the load side 40 is fixed in the wireless power transmission system.

Here, it is described as one example that the impedance RL of the load side 40 is the constant value of 100 ohm and the resonance frequency at causing the resonance of the transmission unit 20 and the reception unit 30 is 250 KHz.

Figure (a) of FIG. 2 is a graph showing the frequency-to-power transmission efficiency when the coupling factor (K) is 0.5 and the impedance RL of the impedance side 40 is 100 ohm; Figure (b) of FIG. 2 is a graph showing the frequency-to-power transmission efficiency when the coupling factor (K) is 0.3 and the impedance RL of the impedance side 40 is 100 ohm; Figure (c) of FIG. 2 is a graph showing the frequency-to-power transmission efficiency when the coupling factor (K) is 0.15 and the impedance RL of the impedance side 40 is 100 ohm; and Figure (d) of FIG. 2 is a graph showing the frequency-to-power transmission efficiency when the coupling factor (K) is 0.05 and the impedance RL of the impedance side 40 is 100 ohm.

As shown in (a) to (d) of FIG. 2, the graphs of the frequency-to-power transmission efficiency show that the power transmission efficiency is low and the flatness characteristic is not good at the resonance frequency (250 KHz). These facts will be described in detail below in comparison with (a) to (d) of FIG. 6.

FIG. 3 illustrates a configuration of a wireless power transmission system according to another embodiment.

Referring to FIG. 3, the wireless power transmission system 200 includes a power source 110, a wireless power transmitter 120, a wireless power receiver 130 and a load side 140.

The wireless power transmitter 120 may include a transmitting unit 121 and a detecting unit 122.

The wireless power receiver 130 may include a receiving unit 131 and an impedance control unit 132.

Since the power source 110, the transmitting unit 121, the receiving unit 131 and the load side 140 are the same as the power source 10, the transmitting unit 20, the receiving unit 30 and the load side 40 of FIG. 1, the detailed description of them will be omitted.

The impedance control unit 132 will be described in detail in FIG. 5.

The wireless power transmitter 120 and the wireless power receiver 130 may interexchange information through in-band communication or out-of-band communication.

The in-band communication means communication that information is exchanged by using a signal having a frequency used for the wireless power transmission between the wireless power transmitter 120 and the wireless power receiver 130. The wireless power receiver 130 may or may not receive power transmitted from the wireless power transmitter 120 through a switching operation. Thus, the wireless power transmitter 120 detects an amount of power consumed in the wireless power transmitter 130, such that the wireless power transmitter 120 may recognize an on signal or off signal of the wireless power receiver 130.

In detail, the wireless power receiver 130 may use the resistor and a switch 141 to vary the amount of power absorbed at a resistor, such that the wireless power receiver 130 may change the power consumed in the wireless power transmitter 120. The wireless power transmitter 120 may sense the variation of the consumed power, such that the wireless power transmitter 120 may obtain state information of the wireless power receiver 130. The switch 141 and the resistor may be connected in series with each other. In one embodiment, the state information of the wireless power receiver 130 may include information about a present charge amount and a change of the charge amount in the wireless power receiver 130.

In more detail, if the switch 141 is open, the power absorbed in the resistor becomes 0 (zero) and the consumed power in the wireless power transmitter 120 is reduced.

If the switch 141 is short-circuited, the power absorbed in the resistor is greater than 0 (zero) and the consumed power in the wireless power transmitter 120 is increased. While the wireless power transmitter 120 repeats the operation, the wireless power transmitter 120 detects the power consumed in the wireless power transmitter 120, such that the wireless power transmitter 120 may perform digital-communication with the wireless power receiver 130.

The wireless power transmitter 120 may receive the state information of the wireless power receiver 130 through the above operation and may transmit the suitable power.

To the contrary, by providing a resistor and a switch to the wireless power transmitter 120 side, it is possible to transmit the state information of the wireless power transmitter 120 to the wireless power receiver 130. In one embodiment, the state information, which may be transmitted by the wireless power transmitter 120, may include information about the maximum amount of supply power which the wireless power transmitter 120 can transmit, a number of wireless power receivers 130 to which the wireless power transmitter 120 can transmit power, and an usable amount of power of the wireless power transmitter 120.

To the contrary, by providing a resistor and a switch 141 to the wireless power transmitter 120 side, it is possible to transmit the state information of the wireless power transmitter 120 to the wireless power receiver 130. In one embodiment, the state information, which may be transmitted by the wireless power transmitter 120, may include information about the maximum amount of supply power which the wireless power transmitter 120 can transmit, a number of wireless power receivers 130 to which the wireless power transmitter 120 can transmit power, and an usable amount of power of the wireless power transmitter 120.

The detecting unit 122 may detect the coupling state between the transmission resonant coil L2 and the reception resonant coil L3. In one embodiment, the coupling state may be recognized by measuring the coupling factor between the transmission resonant coil L2 and the reception resonant coil L3.

In one embodiment, the information about the coupling state may be information for controlling the impedance of the load side 140. In detail, the information about the coupling state may be information about the coupling factor between the transmission resonant coil L2 and the reception resonant coil L3 which is necessary for controlling the impedance of the load side 140.

The wireless power transmitter 120 may transmit the information about the coupling state through the in-band communication or the out-of-band communication to the wireless power transmitter 130.

The impedance control unit 132 of the wireless power receiver 130 may use the information about the coupling state received from the wireless power transmitter 120 to determine the impedance of the load side 140, and may control the impedance of the load side 140 according to the determined impedance.

By controlling the impedance of the load side 140 according to the coupling state, the flatness characteristics of the graphs of the power transmission efficiency and the frequency-to-power efficiency may be improved. This fact will be described in detail below with reference to FIG. 6.

The information about the coupling state is needed to control the impedance of the load side 140 and may be recognized by detecting the coupling factor in one embodiment.

Hereinafter, the method for controlling the impedance of the load side 140 according to the coupling factor detected will be described.

First, the method for controlling the impedance of the load side 140 according to the coupling factor detected will be described with reference to FIG. 7.

FIG. 7 is a flowchart illustrating an impedance control method of the wireless power transmission system 1000 which can detect the coupling factor and can control the impedance of the load side 140 according to the coupling factor.

Referring to FIG. 7, in step S21, the detecting unit 122 measures the first input impedance Z1 seen by the power source 110 to the transmitting unit 121. In one embodiment, the detecting unit 122 may measure the first impedance Z1 by using a current and a voltage output from the power source 110, and the embodiment is not limited thereto.

In one embodiment, the detecting unit 122 may use equation 2 to calculate the second input impedance Z2. That is, referring to equation 1 of FIG. 2, since the third input impedance Z3 is already known and any other variables except for the mutual inductance M2 have fixed values, the second input impedance Z2 may be expressed by an equation for the mutual inductance M2. The detecting unit 122 may calculate the mutual inductance M2 through the second input impedance Z2 expressed with the mutual inductance M2 and equation 3. In detail, when the second input impedance Z2 expressed with the mutual inductance M2 is applied to equation 3, the first input impedance Z1 may be converted into an equation of the mutual inductance M2.

Referring to FIG. 7 again, in step S22, the detecting unit 122 may calculate the mutual inductance M2 using the first input impedance Z1 and may detect the coupling factor K using the mutual inductance M2 and equation 10. In one embodiment, the wireless power transmission system may further include a memory unit which stores a lookup table in which the first, second and third input impedances Z1, Z2 and Z3, the mutual inductance M2 and the coupling factor K are stored corresponding to each other. The detecting unit 122 may search the memory unit to detect the coupling factor K.

In step 23, the detecting part 122 may determine the impedance of the load side 140 according to the detected coupling factor value. In one embodiment, the wireless power transmitter 120 may store the lookup table, in which the coupling factor and the impedance of the load side 140 are stored corresponding to each other, in the memory unit (not shown). That is, the wireless power transmitter 120 may determine the impedance of the load side 140 according to the coupling factor detected by using the impedance of the load side 140 corresponding to the coupling factor.

In step S24, the wireless power transmission system 1000 may control the impedance control unit 132 such that power is transmitted to the load side 140 based on the impedance of the load side 140.

In one embodiment, the wireless power receiver 130 may receive the information about the impedance of the determined load side 140 through the in-band communication or the out-of-band communication from the wireless power transmitter 120. Then, the wireless power receiver 130 may control the impedance control unit 132 based on the received information about the impedance of the load side 140.

The method for changing the impedance of the load side 140 includes a method of using a DC-DC converter and a method of using a battery management device, each of which is the same as that described in FIG. 5

Next, an impedance control method according to another embodiment will be described with reference to FIG. 8.

The impedance control method according to another embodiment allows the impedance of the load side 140 to be open-circuited and measures the first input impedance Z1 seen by the power source 110 to the transmitting unit 121, such that the coupling factor value is detected.

First, in step S31, the detecting unit 122 transmits a control signal for allowing the load side 140 to be open-circuited to the load side 140, so that the load side 140 is open-circuited. In one embodiment, one terminal of the load resistor RL may be connected to an additional switch 141. The detecting unit 122 may transmit an open signal to the switch 141 connected to the load resistor, such that the load resistor may be open-circuited. In this case, it may be analyzed that the load resistor RL of the load side 140 has an infinite value. Then, the value of the third input impedance Z3 becomes '0 (zero)' in Equation 1 as following equation 11.

$$Z_3 = \frac{\omega^2 M_3^2}{R_L + j\omega L_4} = 0 \qquad \text{Equation 11}$$

If the third input impedance Z3 becomes 0 (zero), the second impedance Z2 of equation 2 is defined as following equation 12.

$$Z_2 = \frac{j\omega^3 C_3 M_2^2}{1 - \omega^2 L_3 C_3 + j\omega C_3 (Z_3 + R_3)} = \frac{\omega^2 M_2^2}{R_3} \qquad \text{Equation 12}$$

The first input impedance Z1 is defined as following equation based on equation 1.

$$Z_1 = j\omega L_1 + \frac{j\omega^3 C_2 M_1^2}{1 - \omega^2 L_2 C_2 + j\omega C_2(Z_2 + R_2)}$$

$$= j\omega L_1 + \frac{M_1^2 R_3}{\omega^2 M_2^2 + R_2 R_3}$$

Then, the detecting unit 122 measures the first input impedance Z1. The first input impedance is an impedance seen by the power source 110 to the transmitting unit 121. The detecting unit 122 may calculate the mutual impedance M2 by using the first input impedance Z1 and equation 12. That is, the second input impedance Z2 may be defined as an equation of the mutual inductance M2. If the second input impedance Z2 defined by the mutual impedance Z2 may be applied to equation 1, the first input impedance Z1 may be defined as an equation of the mutual inductance M2.

The detecting unit 122 may calculate the mutual inductance M2 by using the above equation of the measured first input impedance Z1 and the mutual inductance M2 derived by clearing.

In step S33, the detecting unit 122 may detect the coupling factor K by using the measured first input impedance Z1, the mutual inductance M2 calculated through it and equation 10.

In step S34, the detecting unit 122 may determine the impedance of the load side 140 according to the detected coupling factor value. In one embodiment, the wireless power transmitter 120 may store the lookup table, in which the coupling factor and the impedance are stored corresponding to each other, in the memory unit (not shown). That is, the wireless power transmitter 120 may determine the load impedance according to the coupling factor which is detected by using the impedances corresponding to each coupling factor.

In step S35, the detecting unit 122 may control the impedance control unit 132 such that power may be transmitted based the determined impedance.

The impedance control method, which is described in connection with the contents of FIG. 8, may reduce the number of variables used in the calculation of the coupling factor K, so that the accuracy may be improved and the calculation speed of the coupling factor may be increased.

FIG. 4 illustrates a configuration of a wireless power transmission system according to still another embodiment.

The wireless power transmission system 200 according to the second embodiment includes a power source 110, a wireless power transmitter 120, a wireless power receiver 130 and a load side 140.

The wireless power transmitter 120 may include a transmitting unit 121.

The wireless power receiver 120 may include a receiving unit 131, a detecting unit 122, an impedance control unit 132.

Since the power source 110, the receiving unit 131 and the load side 140 are the same as those of FIG. 1, the detailed description of them will be omitted.

The impedance control unit 132 will be described in detail below with reference to FIG. 5

The detecting unit 122 may detect a coupling factor K between the a transmission resonant coil L2 and a reception resonant coil L3.

Hereinafter, the impedance control method according to still another embodiment will be described with reference to FIG. 9.

First, referring to FIG. 9, in step S11, the wireless power receiver 130 may control the wireless power transmitter 120 such that the transmitting unit 121 may transmit the power having a frequency signal in a predetermined band. The frequency signal in the predetermined band may be a frequency signal of 100 KHz or above. The power intensities of frequency signals in the predetermine band may be equal to each other.

In step S12, the wireless power receiver 130 may measure the power received by the receiving unit 131.

In step S13, the wireless power receiver 130 may detect the coupling factor K by using the powers transmitted by the transmitting unit 121 and received by the receiving unit 131. In detail, the wireless power receiver 130 may obtain the power transmission efficiency through a ratio of the transmitted power to the received power. The power transmission efficiency may be expressed as a graph showing relationships between frequencies and power transmission efficiencies. The coupling factor may be detected by comparing the expressed graph and the graph of FIG. 2.

Here, the graph of the frequency-to-power transmission efficiency is not limited to that of FIG. 2, but may further include various forms of graphs according to coupling factors.

In step S14, the wireless power receiver 130 determines the impedance of the load side 140 according to the detected coupling factor. In one embodiment, the wireless power receiver 130 may further include a memory unit (not shown), in which a lookup table, which stores the power efficiency, the coupling factor K and the impedance corresponding to each other, is stored. That is, when the wireless power receiver 130 may detect the power efficiency, the wireless power receiver 130 may determine the impedance of the load side 140 by using the coupling factor and the impedance corresponding to the detected power efficiency.

In step S15, the detecting unit 122 controls the impedance control unit 132 based on the determined impedance. Thus, the impedance of the load side 140 may be controlled according to the determined impedance. The method for controlling the impedance of the load side 140 includes a method of using a DC-DC converter and a method of using a battery management device, each of which will be described below with reference to FIG. 5.

FIG. 5 is a view showing one example of controlling the impedance between both terminals of a load side according to one embodiment.

The impedance control unit 132 may change the impedance of the load side 140 according to the coupling factor K detected by the method described above. The method of changing the impedance of the load side 140 may be implemented by using the following two methods.

One method is to change the impedance of the load side 140 by using a BMIC (Battery Management IC) 132a for the impedance control unit 132.

The BMIC 132a is a device which controls an amount of current flowing through a battery.

*Referring to (a) of FIG. 5, the impedance of the load side 140 may be expressed by following equation 13:

$$R_L = \frac{V_C}{I_C} \quad \text{Equation 13}$$

Wherein, $I_C$ denotes a current controlled through the BMIC 132*a*, and $V_C$ denotes a voltage applied to the load resistor RL. The load resistor RL denotes the battery and may have a variable value.

The current $I_C$ input to the load resistor RL may be controlled through the BMIC 132*a*, and when a value of $V_C$ is known, the BMIC 132*a* may control the current $I_C$ input to the load side 140 based on the impedance determined according to the detected coupling factor, such that the impedance of the load side 140 may be controlled.

The other method is to change the impedance value of the load side 140 by using a DC-DC converter 132*b* applied to the impedance control unit 132.

The DC-DC converter 132*b* performs a function of converting a direct voltage into another direct voltage and is classified into a switching type and a linear type. Preferably, a switching type of DC-DC converter may be used. The switch type is to allow an output side to obtain a suitable current by converting an unstable direct current generated by rectifying AC current into a pulse current by a switch circuit 141.

Referring to (b) of FIG. 5, the impedance of the load side 140 may be expressed as following equation 14:

$$R_{in} = E_d \left(\frac{V_{in}}{V_{out}}\right)^2 R_L \qquad \text{Equation 14}$$

Wherein, Ed denotes an efficiency of the DC-DC converter 132*b*, Vout denotes a voltage applied to the load resistor RL 142, Vin denotes a voltage applied to the load side 140, and Rin denotes an impedance of the load side 140.

Generally, since the efficiency Ed of the DC-DC converter 132*b*, the voltage Vin applied to the load resistor RL, and the load resistor RL have fixed values, the impedance control unit 130 may change the voltage applied to the load resistor RL, changing the impedance value of the load side 140.

FIG. 6 is graphs of frequency-to-power transmission efficiency when the impedance of the load side is controlled according to the impedance control method of the embodiment.

Here, the controlled impedance ZL of the load side 140 has a valued varied according to the coupling factor K, and it will be described as one example that the resonant frequency is 250 KHz when the resonance between the transmitting unit 121 and the receiving unit 131 occurs.

In FIG. 6, (a) is a graph of the frequency-to-power transmission efficiency when the coupling factor K is 0.5 and the controlled impedance ZL of the load side 140 is 20 ohm, (b) is a graph of the frequency-to-power transmission efficiency when the coupling factor K is 0.3 and the controlled impedance ZL of the load side 140 is 50 ohm, (c) is a graph of the frequency-to-power transmission efficiency when the coupling factor K is 0.15 and the controlled impedance ZL of the load side 140 is 100 ohm, and (d) is a graph of the frequency-to-power transmission efficiency when the coupling factor K is 0.05 and the controlled impedance ZL is 400 ohm.

The controlled impedance ZL of the load side 140 has a value changed by the impedance control unit 132 to improve the power transmission efficiency according to the coupling factor K detected by the detecting unit 122.

Referring to (a) to (d) of FIG. 6, like FIG. 2, when the impedance of the load side 140 is not fixed but varied according to the coupling factor K, it may be known that the power transmission efficiency is improved at near the resonance frequency of 250 KHz and the frequency bandwidth having a high power transmission efficiency is larger.

In detail, comparing (a) to (d) of FIG. 2 with (a) to (d) of FIG. 6, the impedance control method will be described.

Referring to (a) of FIG. 2, due to over-coupling between the transmission side and the reception side, two poles occur and the power transmission efficiency is about 43% at 250 KHz.

To the contrary, referring to (a) of FIG. 6, not two, only one pole occurs and the power transmission efficiency is about 90% at 250 KHz. Thus, it may be known that the power transmission efficiency of (a) of FIG. 6 is improved more than that of (a) of FIG. 2. That is, when the coupling factor K is 0.5 and the impedance of the load side is changed from 100 ohm to 20 ohm, it may be known that the power transmission efficiency is improved.

Next, referring to (b) of FIG. 2, due to over-coupling between the transmission side and the reception side, two poles occur and the power transmission efficiency is about 80% at the resonance frequency of 250 KHz. In this case, although the power transmission efficiency is high at the pole frequency, the flatness is not good and it is difficult to forecast the pole frequency, so that it is difficult to obtain uniformity in mass production.

To the contrary, referring to (b) of FIG. 6, not two, only one pole occurs and the power transmission efficiency is about 94% at the resonance frequency of 250 KHz. Thus, it may be known that the power transmission efficiency of (a) of FIG. 6 is improved more than that of (b) of FIG. 2. That is, when the coupling factor K is 0.3 and the impedance of the load side is changed from 100 ohm to 50 ohm, it may be known that the power transmission efficiency is improved.

Next, referring to (c) of FIG. 2 and (c) of FIG. 6, in this case, the coupling factor K is 0.15 and the impedance of the load side is 100 ohm. The power transmission efficiency is relatively high as about 95% at the resonance frequency of 250 KHz and the flatness characteristic having the constant power transmission efficiency at near the resonance frequency is excellent. Since the flatness characteristic is excellent, the uniformity may be obtained in mass production. That is, when the coupling factor K is 0.15 and the impedance of the load side is 100 ohm, it is known that excellent flatness characteristic as well as the high power transmission efficiency may be obtained.

Next, referring to (d) of FIG. 2, although the power transmission efficiency is about 90% at the resonance frequency of 250 KHz, the frequency bandwidth in which the power transmission efficiency is high is narrow, so that the flatness characteristic is not good.

To the contrary, referring to (d) of FIG. 6, the power transmission efficiency is about 93% at the resonance frequency of 250 KHz. Thus, it is known that the power transmission efficiency is improved more than that of (d) of FIG. 2 and the frequency bandwidth in which the power transmission efficiency is high is larger. That is, when the coupling factor K is 0.05 and the impedance of the load side is changed from 100 ohm to 400 ohm, it may be known that the power transmission efficiency and the flatness characteristic are improved.

Thus, when the impedance of the load side is changed according to the coupling factor, rather than fixing the impedance of the load side, it may be known that the power transmission efficiency and the flatness characteristic are improved. Since the coupling factor K may vary according to at least one of a distance between, directions and locations of the wireless power transmitter and the wireless power receiver, if the coupling factor is detected and the impedance of the load side is controlled according to the detected coupling factor, the power transmission efficiency and the flatness characteristic may be improved.

That is, the above effects may be obtained through the procedure of detecting the coupling factor described with reference to FIGS. 3 and 4 and the procedure of controlling the impedance of the load side based on the detected coupling factor described with reference to FIG. 5.

Hereinafter, a wireless power transmission system and a power transmission method according to still another embodiment will be described with reference to FIGS. 10 to 12.

Figure 10:
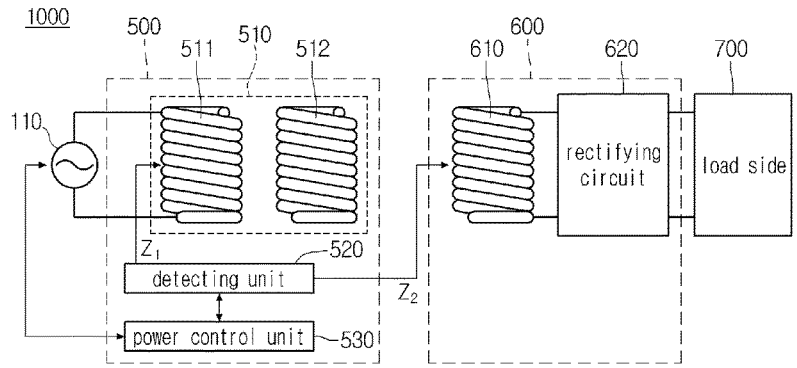
FIG. 10 is a view illustrating a configuration of a wireless power transmission system according to still another embodiment.

FIG. 10 is a view showing a configuration of a wireless power transmission system according to still another embodiment. FIG. 11 is a circuit diagram showing an equivalent circuit of a wireless power transmission system according to still another embodiment. FIG. 12 is a flowchart illustrating a power transmission method according to an embodiment.

First, referring to FIG. 10, the wireless power transmission system 1000 includes a power source 110, a wireless power transmitter 500, a wireless power receiver 600 and a load side 700. The power transmitted to the wireless power transmitter 500 is transferred through a rectifier circuit 620 to the load side 700. The load side 700 may be a battery or other devices requiring power. In the embodiment, the load side 700 is referred to as a resistor RL. In the embodiment, the load side 700 may be included in the wireless power receiver 600.

The wireless power transmitter 500 includes a transmitting unit 510, a detecting unit 520, and a power control unit 530.

The transmitting unit 510 includes a transmission induction coil unit 511 and a transmission resonant coil unit 512.

The wireless power transmitter 500 includes a receiving unit 600 and a rectifier circuit 620.

The receiving unit 610 includes a reception coil unit 611.

The power generated from the power source 110 is transferred to the wireless power transmitter 500, and the power transferred to the wireless power transmitter 500 is transferred by electromagnetic induction to the wireless power receiver 600.

In detail, the power source 110 is an AC power source for providing AC power of a predetermined frequency.

The transmitting unit 510 is connected to the power source 110 and receives AC power from the power source 110, so that an AC current flows through the transmitting unit 510. When the AC current flows through the transmission induction coil 511, an AC current is induced by electromagnetic induction to the transmission resonant coil unit 512 physically spaced apart from the transmission induction coil unit 511. The power transferred to the transmission resonant coil unit 512 is transferred by electromagnetic induction to the wireless power receiver 600.

The receiving unit 610 receives the power through the reception coil unit 611. The power transferred to the reception coil unit 611 is rectified by the rectifier circuit 620 and transferred to the load side 700.

Since the configuration of the wireless power receiver 600 is simple, applicability of the wireless power transmission system 1000 including a resonant type of the wireless power transmitter 500 and a magnetic induction type of the wireless power receiver 600 to an electronic appliance such as a mobile device which is needed to make smaller may be increased.

Figure 11:
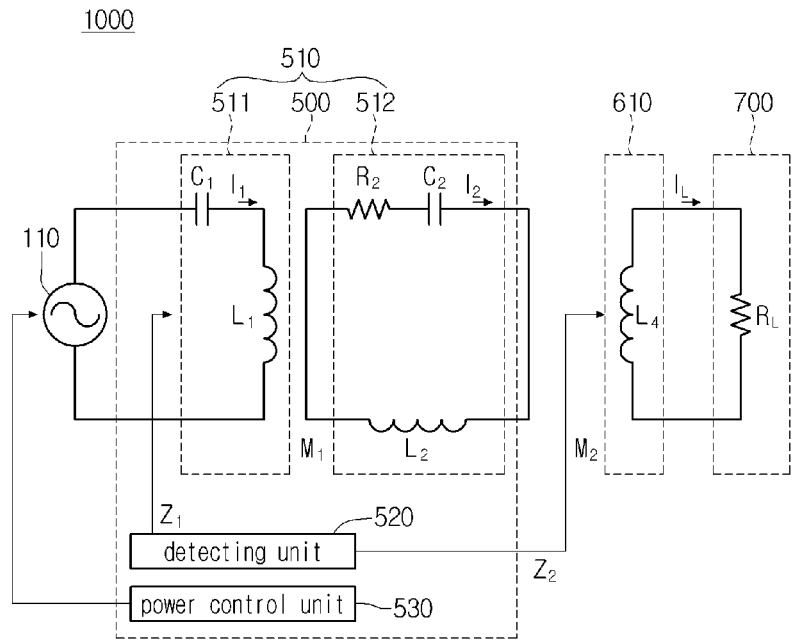
FIG. 11 is a circuit diagram showing an equivalent circuit of a wireless power transmission system according to still another embodiment.

Referring to FIG. 11, the transmission induction coil unit 511 includes a transmission induction coil L1 and a capacitor C1. The capacitance of the capacitor C1 may be a constant value.

One terminal of the capacitor C1 is connected to one terminal of the power source 100, and the other terminal of the capacitor C1 is connected to one terminal of the transmission induction coil L1. The other terminal of the transmission induction coil L1 is connected to the other terminal of the power source 100.

The transmission resonant coil unit 512 includes a transmission resonant coil L2, a capacitor C2 and a resistor R2. The transmission resonant coil L2 has one terminal connected to one terminal of the capacitor C2 and the other terminal connected to one terminal of the resistor R2. The other terminal of the resistor R2 is connected to the other terminal of the capacitor C2. The resistor R2 denotes an amount of a power loss caused by a power loss in the transmission resonant coil L2.

The detecting unit 520 may detect a value of the coupling factor between the transmission resonant coil L2 and the reception coil L3. The coupling factor expresses a degree of electromagnetic coupling between the transmission resonant coil L2 and the reception coil L3 which may vary by at least one of a distance between, directions and locations of the transmission resonant coil unit 512 and the reception coil unit 611.

The detecting unit 520 may measure a first input impedance Z1 seen by the power source 110 to the transmitting unit 510 and detect the value of the coupling factor based on the measured first input impedance Z1.

The power control unit 530 may control the power transferred to the wireless power receiver 600 based on the detected value of the coupling factor.

The power control unit 530 controls the power transferred to the wireless power transmitter 500 by controlling the power source 100, such that the power transferred to the wireless power receiver 600 is controlled.

The power control unit 530 may control the power source 110 according to a variation of the coupling factor value such that the power transferred to the wireless power receiver 600 is constant.

Hereinafter, procedures of detecting a value of a coupling factor between the transmission resonant coil L2 and the reception coil L3 through the detecting unit 520 and of transmitting power to the wireless power receiver 600 according to the detected value of the coupling factor through the power control unit 530 will be described.

Figure 12:
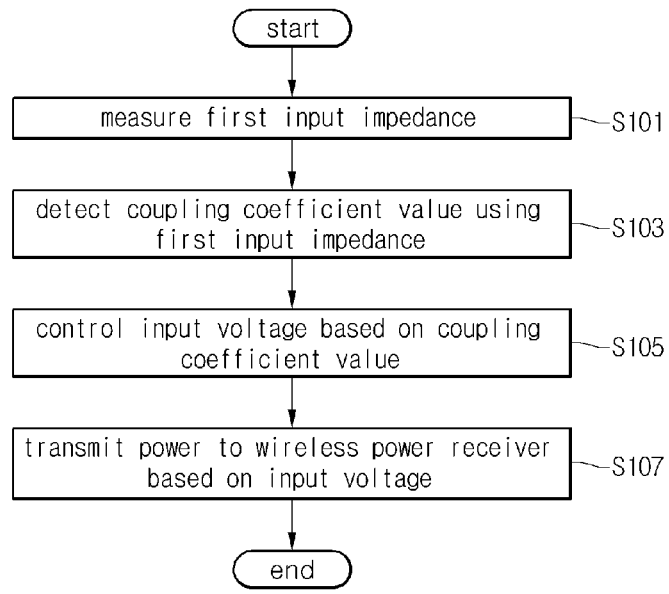
FIG. 12 is a flowchart illustrating a wireless power transmission method according to still another embodiment.

First, referring to FIG. 12, in step S101, the wireless power transmitter 500 measures the first input impedance Z1. In detail, the wireless power transmitter 500 may measure the first input impedance Z1 based on the second input impedance Z2. The first impedance Z1 is the impedance seen by the power source 100 to the transmitting unit 510.

The second impedance Z2 is the impedance seen by the wireless power transmitter 500 to the wireless power receiver 600 and may be expressed as following Equation 15:

$$Z_2 = \frac{\omega^2 M_2^2}{R_2 + j\omega L_3}$$ Equation 15

Wherein, is the resonance frequency and may be expressed as following Equation 16:

$$\omega = \frac{1}{\sqrt{L_2 C_2}} \quad \text{Equation 16}$$

Wherein, $C_2$ denotes the capacitor expressed when the transmission resonant coil unit 512 is transformed into the equivalent circuit.

In Equation 15, M2 denotes the mutual inductance between the transmission resonant coil L2 and the reception coil L3, and RL denotes the load resistor of the load side 700. Equation 15 is based on the frequency domain, and hereinafter, all equations will be based on the frequency domain. The mutual impedance M2 is the value which may vary according to the coupling factor K2 between the transmission resonant coil L2 and the reception coil L3.

Referring to Equation 15, the second impedance Z2 may be written as the equation of the mutual inductance M2.

The coupling factor K2 denotes a degree of electromagnetic coupling between the transmission resonant coil L2 and the reception coil L3 which may vary by at least one of a distance between, directions and locations of the transmission resonant coil L2 and the reception coil L3.

The first input impedance Z1 may be expressed as following Equation 17:

$$Z_1 = j\omega L_1 + \frac{1}{j\omega C_1} + \frac{j\omega^3 C_2 M_1^2}{1 - \omega^2 L_2 C_2 + j\omega C_2 (Z_2 + R_2)} \quad \text{Equation 17}$$

Wherein, M1 is the mutual inductance between the transmission induction coil L1 and the transmission resonant coil L2 and R2 is the resistor which denotes the amount of power loss caused by the power loss of the transmission resonant coil L2.

Although the capacitor C2 and the leakage resistor R2 may be fixed values, the mutual inductance M1 may be the value which varies according to the coupling factor K1 between the transmission induction coil L1 and the transmission resonant coil L2. The coupling factor K1 has a constant value.

Equation 17 may be expressed through Equation 16 as following Equation 18:

$$Z_1 = j\omega L_1 + \frac{1}{j\omega C_1} + \frac{\omega^2 M_1^2}{Z_2 + R_2} \quad \text{Equation 18}$$

It is assumed that the quality factor Q is excellent, if R2 is replaced by 0 (zero) and Equation 15 is applied to Equation 18, the first input impedance Z1 may be defined as following Equation 19:

$$Z_1 = \frac{1}{j\omega C_1} + j\omega \left( L_1 + \frac{M_1^2}{M_2^2} L_3 \right) + \frac{M_1^2}{M_2^2} R_L \quad \text{Equation 19}$$

Wherein, the mutual inductances M1 and M2 are expressed as following Equations 20 and 21:

$$M_1 = k_1 \sqrt{L_2 L_1} \quad \text{Equation 20}$$

$$*M_2 = k_2 \sqrt{L_2 L_3} \quad \text{Equation 21}$$

When Equations 20 and 21 are applied to Equation 19, the first input impedance Z1 may be defined as following Equation 22:

$$Z_1 = \frac{1}{j\omega C_1} + j\omega L_1 \left(1 + \frac{k_1^2}{k_2^2}\right) + \frac{L_1}{L_3} \frac{k_1^2}{k_2^2} R_L \quad \text{Equation 22}$$

The resonance frequency $\omega$ is expressed as following Equation 23:

$$\omega = \frac{1}{\sqrt{L_1 C_1}} \quad \text{Equation 23}$$

If Equation 23 is applied to Equation 22, the first input impedance Z1 may be defined as following Equation 24:

$$Z_1 = \frac{k_1^2}{k_2^2} \left( j\omega L_1 + \frac{L_1}{L_3} R_L \right) \quad \text{Equation 24}$$

The coupling factor K1 is a constant value, and the coupling factor K2 has a value which varies according to a distance between, directions and locations of the transmission resonant coil L2 and the reception coil L3. The values of L1, L3 and RL are fixed in designing the circuit.

Referring again to FIG. 12, in step S103, the detecting unit 520 may measure the first input impedance Z1 and may detect the coupling factor K2 by using Equation 24. In one embodiment, the detecting unit 520 may measure the rms values of the input voltage and the input current input from the power source 110 to the wireless power transmitter 500 to measure the first input impedance Z1. That is, the detecting unit 520 may measure the first input impedance Z1 by using following Equation 25:

$$Z_1 = \frac{V_{RMS}}{I_{RMS}} \quad \text{Equation 25}$$

Wherein, Vrms is the rms of the input voltage input from the power source 110 to the wireless power transmitter 500 and Irms is the rms of the input current input from the power source 110 to the wireless power transmitter 500. The input voltage may be a constant value.

If the distance between the wireless power transmitter 500 and the wireless power receiver 600 is greater, so that the coupling factor K2 is small, the first input impedance Z1 is greater, so that the input current becomes small. Thus, the transmission power transferred from the power source 110 to the wireless power transmitter 500 becomes small. Since if the transmission power is small, the power received at the wireless power receiver 600 is small, there is a need to control the input voltage in order to provide constant power to the wireless power receiver 600.

Referring again to FIG. 12, in step S105, the wireless power transmitter 500 may control the power source 110 based on the detected coupling factor, such that the wireless power transmitter 500 may control the input voltage in order that the power transferred to the wireless power receiver 600 is constant. In detail, the transmission power according to the coupling factor K2 is expressed as following Equation 26:

$$P_{in} = \frac{V_{RMS}^2}{|Z_1|} \quad \text{Equatioon 26}$$

-continued $$= V_{RMS}^2 \frac{k_2^2}{k_1^2} \frac{L_3}{L_1} \frac{1}{\sqrt{\omega_2 L_3^2 + R_L^2}}$$

Following Equation 27 about the input voltage may be given from Equation 26:

$$V_{RMS} = \frac{k_1}{k_2} \sqrt{P_{in} \frac{L_1}{L_3} \sqrt{\omega_2 L_3^2 + R_L^2}} \quad *\text{Equation 27}$$

Referring to Equation 27, according to the related art, if the coupling factor K2 varies according to the distance between, directions and locations of the transmission resonant coil L2 and the reception coil L3, since the input voltage (VRMS) has a fixed value, the constant transmission power is not kept. For example, if the wireless power transmitter 500 is very far away from the wireless power receiver 600, so that the coupling factor K2 is reduced, the transmission power Pin is reduced according to Equation 12, so that the wireless power transmitter 500 may not transmit a constant power to the wireless power receiver 600.

However, the wireless power transmitter 500 according to the embodiment may keep a constant transmission power Pin by changing the input voltage VRMS according to the coupling factor K2. For example, if the wireless power transmitter 500 is very far away from the wireless power receiver 600, so that the coupling factor K2 is reduced, the input voltage VRMS is increased such that the constant transmission power may be kept.

That is, although the coupling factor is reduced, the wireless power transmitter 500 keeps the transmission power at a constant level, so that power may be smoothly provided to the wireless power receiver 600.

In detail, the power control unit 530 may change the input voltage of Equation 13 in order that the power received by the wireless power receiver 600 is constant. That is, the power control unit 530 may change the input voltage VRMS according to the detected coupling factor, such that the transmission power is constant.

Then, in step S107, the wireless power transmitter 500 may transmit the power controlled by the power control unit 530 to the wireless power receiver 600. That is, the wireless power transmitter 500 may control the input voltage based on the detected coupling factor, such that the constant power may be transmitted to the wireless power receiver 600.

As described above, the wireless power transmitter 500 may detect the coupling factor and change the input voltage according to the detected coupling factor, such that the wireless power transmitter 500 may keep the transmission power at a constant level. If the constant transmission power is kept, although the coupling factor is changed by the distance between, and locations and the directions of the wireless power transmitter 500 and the wireless power receiver 600, so that and the power transmission efficiency is reduced, the wireless power transmitter 500 may transmit stable power to the wireless power receiver 600.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power transmitter which wirelessly transmits power through a wireless power receiver to a load side, the wireless power transmitter comprising:
   a power source for generating AC power;
   a transmission coil for wirelessly transferring the AC power to a reception coil included in the wireless power receiver; and
   a detecting unit for detecting a coupling state between the transmission coil and the reception coil,
   wherein the detecting unit measures a first input impedance seen by the power source to the wireless power transmitter after opening the load side and detects the coupling state based on the measured first input impedance.

2. The wireless power transmitter of claim 1, further comprising:
   a communication unit for transmitting information about the coupling state to the wireless power receiver through in-band communication or out-of-band communication.

3. The wireless power transmitter of claim 1, wherein the information about the coupling state is used for controlling an impedance of the load side.

4. The wireless power transmitter of claim 1, wherein the detecting unit measures a first input impedance seen by the power source to the wireless power transmitter and detects the coupling state based on the first input impedance.

5. The wireless power transmitter of claim 4, wherein the detecting unit detects the coupling state based on a second input impedance seen by the wireless power transmitter to the wireless power receiver, a third input impedance seen by the reception coil to the load side and the measured first input impedance.

6. The wireless power transmitter of claim 5, wherein the wireless power transmitter or the wireless power receiver includes a memory unit which stores a lookup table in which the first, second, and third input impedances and the coupling state are stored corresponding to each other.

7. The wireless power transmitter of claim 4, wherein the detecting unit detects the coupling state based on a second input impedance seen by the wireless power transmitter to the wireless power receiver and the measured first input impedance.

8. The wireless power transmitter of claim 1,
   wherein the transmission coil transfers the AC power to the reception coil included in the wireless power receiver by using resonance or electromagnetic induction.

9. The wireless power transmitter of claim 1, further comprising:
   a power control unit for controlling the power transmitted by the wireless power transmitter based on the coupling state.

10. The wireless power transmitter of claim 9, wherein the power control unit controls an input power of the wireless power transmitter according to the coupling state to keep the transmitted power at a predetermined level.

11. An impedance control method of a wireless power transmitting system for controlling an impedance of a load side, the impedance control method comprising:

detecting a coupling state between a wireless power transmitter and a wireless power receiver;

transmitting information about the coupling state to the wireless power receiver;

determining the impedance of the load side based on the information about the coupling state; and controlling the impedance of the load side according to the determined impedance, wherein the detecting a coupling state includes measuring a first input impedance seen by a power source to the wireless power transmitter after opening the load side and detecting the coupling state based on the measured first input impedance.

12. The impedance control method of claim 11, wherein the detecting of the coupling state includes measuring an input impedance seen by the power source to the wireless power transmitter and detecting the coupling state based on the input impedance.

13. The impedance control method of claim 11, wherein the transmitting of the information about the coupling state includes transmitting the information about the coupling state to the wireless power receiver through in-band communication or out-of-band communication.

14. The impedance control method of claim 11, wherein the information about the coupling state is used for controlling the impedance of the load side.

* * * * *